United States Patent Office 3,415,743
Patented Dec. 10, 1968

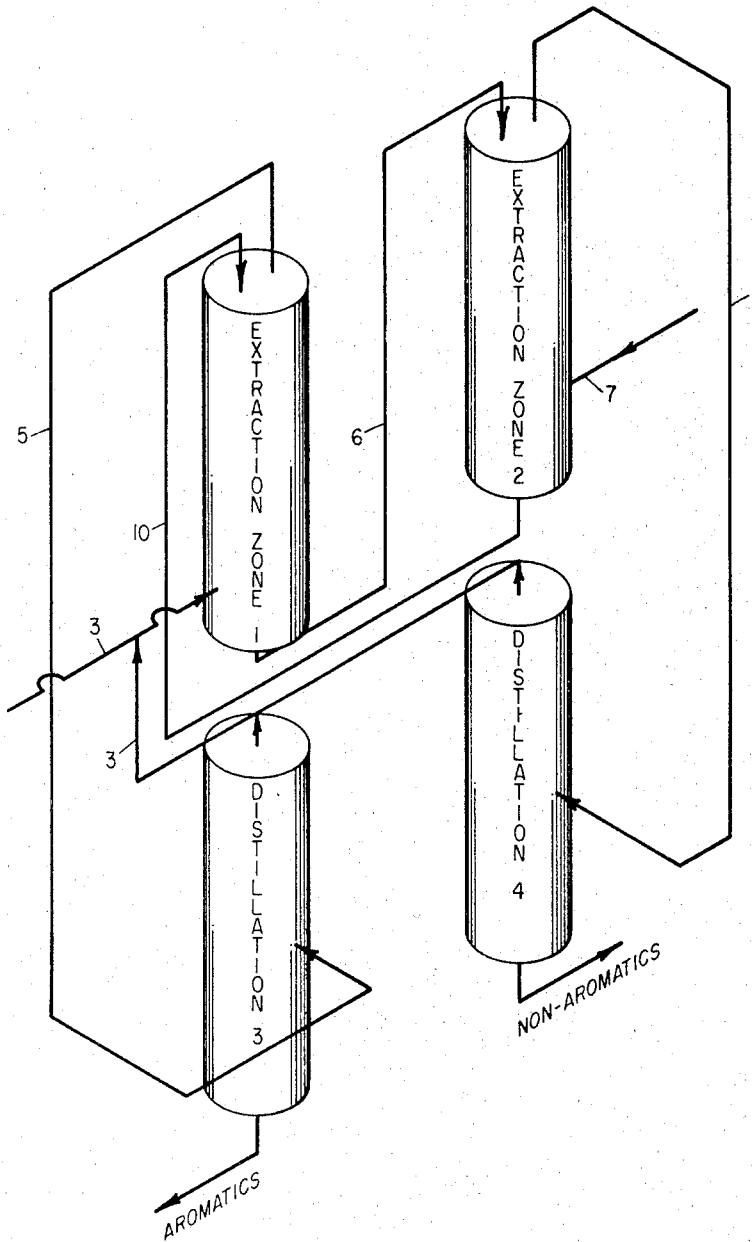

3,415,743
AROMATIC EXTRACTION WITH A MIXTURE OF DIMETHYLFORMAMIDE AND WATER
Alvin L. Benham, Littleton, Colo., assignor to Marathon Oil Company, Findlay, Ohio, a corporation of Ohio
Continuation-in-part of application Ser. No. 343,858, Feb. 10, 1964. This application Aug. 30, 1967, Ser. No. 674,687
10 Claims. (Cl. 208—330)

ABSTRACT OF THE DISCLOSURE

The present invention comprises a process utilizing a solution of dimethylformamide and from about 5 to about 18% water as a solvent for the extraction of heavy aromatics and heavy aliphatics from cycle oil derived from a petroleum cracking step and boiling substantially between about 204° C. to about 316° C., the steps comprising in a closed-loop the contacting of a displacer oil comprising a mixture of aromatic-nonaromatic hydrocarbons containing from about 10 to about 50% xylenes with a solvent comprising a solution of about 5 to about 18% water in dimethylformamide in a first extraction zone, removing a first extract mixture from said first extraction zone to a second extraction zone, removing from said first extraction zone a raffinate containing heavy aromatics, introducing into the second extraction zone said cycle oil having a boiling point higher than that of said displacer oil, removing from the second extraction zone a second extract mixture to the first extraction zone, removing from said second extraction zone a raffinate containing heavy aliphatics, and distilling each of said raffinates to recover said heavy aromatics and said heavy aliphatics, respectively. (All percents herein are by volume, except as noted.)

CROSS REFERENCES TO RELATED APPLICATIONS

This application is a continuation-in-part of my co-pending United States patent application Ser. No. 343,858, filed Feb. 10, 1964 now abandoned.

BACKGROUND OF THE INVENTION

My invention relates to multiple extraction of liquid mixtures with a common selective solvent, and more particularly to the use of dual extraction zones in which two liquids are extracted with the same selective solvent.

Recycle extract dual extraction employs two extraction zones using the same selective solvent to separate two different components. The extract from one zone is recycled to the other zone as a solvent. This type of process is described in U.S. Patents 2,201,549 and 2,201,550. To the applicant's knowledge few processes of this type have been commercially operable due to the difficulty of controlling certain variables in the process. An experimental operation is described in an article by G. S. Somekh, Hydrocarbon Processing and Petroleum Refiner, vol. 42, No. 10, 1963, pp. 157–64.

Variables that must be accurately controlled are extraction zone temperature, composition and selectivity of the dual solvent, ratio of extract recycled to feed, ratio of the separate feed materials and proper feed materials.

Various solvents have been described as useful in such extractions, including ethylene glycol, propylene, $SO_2$, furfural, cresylic acid, $\beta, \beta'$-dichloroethyl ether, quinoline, phenol, and nitrobenzene. Water is sometimes used to increase the selectivity of a particular solvent. The choice of the particular solvent may be the difference between success and failure in finding the optimum conditions. Some solvents do not work satisfactorily in this type of extraction process; for example, aqueous furfural, aqueous phenol, and acetonitrile. I have found that about 5 to about 18%, more preferably about 8 to about 12%, and most preferably about 10% water in dimethylformamide solution is satisfactory as the solvent for my process.

SUMMARY OF THE INVENTION

I have now invented a process wherein two extraction zones are used to extract aromatic compounds from mixtures with nonaromatic compounds with the above described aqueous solvent and light catalytic cycle oil and displacer oil as feeds for the respective extraction zones.

Cycle oil, sometimes called light catalytic cycle oil, is about 204° C. to 316° C. distillation fraction produced from the catalytic cracking of petroleum. Since petroleum varies in its composition, no one set of characteristics will describe the properties of cycle oil. W. L. Nelson, "Petroleum Refining and Engineering," 3rd Edition, McGraw-Hill Book Company, Inc., (1949) 830 pages, describes on page 674 some general characteristics of cycle oil. These are gravity, 20 to 30; characterization factor, 10.6 to 11.6 or lower; boiling range, 204° to 343° C. Brown et al., Cycle Stocks from Catalytic Cracking, Industrial and Engineering Chemistry, vol. 38, p. 136 (1946), on page 137 and following, gave the characteristics of some cycle oils from different petroleum bases. One such oil had the following characteristics: gravity, 27.2, boiling range, 260° to 371° C.; color (Saybolt) 5 Robinson; aniline point, 69.3° C.; refractive index, $N_D^{30}$ 1.5051; and aromatic rings, weight percent, 22%.

My displacer oil is a mixture of nonaromatic compounds, such as heavy naphtha, and 10% to 50% xylenes. About 25% xylenes gives optimum extraction of the desired compounds. The boiling range of the light displacer oil should be below that of the cycle oil. For optimum results the boiling range should be at least 56° C. lower than the cycle oil. Apparently, only polyalkyl aromatic compounds can be mixed with nonaromatic compounds. To form a displacer oil feed in my process, benzene and toluene are not feasible substitutes for xylene.

Generally, my invention comprises the extraction of aromatic and nonaromatic components of cycle oil with the above described solvent comprised of aqueous dimethylformamide used in extraction zones 1 and 2.

The figure shows the flow diagram of the process. In the process in the figure, light displacer oil is fed into extraction zone 1 through line 3. A make-up of displacer oil and solvent is mixed with the recycled solvent and displacer oil from distillation zones 3 and 4 through line 3. Raffinate comprised of solvent, constituents of the displacer oil, some aliphatic compounds, and a large amount of aromatics is passed through line 5 to distillation zone 3 where an alkylnaphthalene-rich aromatic stream is separated from the displacer oil and solvent constituents. Displacer oil and solvent are recycled for further use. An extract comprised of solvent, xylene, and small amounts of impurities is passed through line 6 to extraction zone 2. Cycle oil is fed into extraction zone 2 by line 7. Raffinate comprised of solvent, displacer oil constituents, some aromatic compounds and a great deal of aliphatic compounds are passed to distillation zone 4 through line 9. Nonaromatics are recovered and the remaining distilled portion is recycled to extraction zone 1 by line 3. The extract from extraction zone 2, which is a mixture of solvent and some aromatic and nonaromatic constituents, is recycled through line 10 for use in extraction zone 1.

The following example more fully explains my invention.

EXAMPLE I

In the figure, extraction zones 1 and 2 are filled with a mixture of 10% water and 90% dimethylformamide by weight. Displacer oil, comprising about 75% naphtha and about 25% xylene by weight, is fed into extraction zone 1 at 21,439 lbs./hr. Solvent is also fed into extraction zone 1 at a rate of 300 lbs./hr. water and 2703 lbs./hr. dimethylformamide. From the top of the first extraction zone a raffinate mixture of about 7.5% by weight dimethylformamide, about 56.5% naphtha, about 19.5% xylene, about 5.3% non-naphthalene compounds, about 10.8% naphthalene compounds, and water is taken off for separation by distillation. The extract is fed into extraction zone 2. The extract comprises about 50,997 lbs./hr. of water, dimethylformamide, and xylene; about 476 lbs./hr. non-naphthene compounds; and about 218 lbs./hr. aromatic components. Cycle oil is introduced into extraction zone 2 at 19,800 lbs./hr. The temperature of both extraction zones is maintained at about 38° C. A recycle from extraction zone 2 to extraction zone 1 contains solvent, naphtha, and xylene at 49,428 lbs./hr., with 993 lbs./hr. of non-naphthalene constituents and 3184 lbs./hr. of aliphatic constituents. The raffinate from extraction zone 2 is distilled to separate heavy aliphatics and solvent. The ratio of light displacer oil to light cycle oil ranges from 0.75 to 1.75 lbs./lb.; the optimum ratio is about 1.25 lbs./lb. The ratio of extraction recycle to cycle oil can range from 2.3 to 3.2 lbs./lb.; the optimum ratio being about 2.7 lbs. extraction recycle to 1 lb. of cycle oil. The extraction zone temperature can range from about 35° to 40.8° C.; the optimum temperature is about 38° C.

Although the above example utilizes the most preferred aqueous dimethylformamide solution containing 10% water, similar results are obtained when other concentrations of water in the range of from about 5 to about 18% are utilized.

What is claimed is:

1. A process utilizing a solution of dimethylformamide and from about 5 to about 18% water as a solvent for the extraction of heavy aromatics and heavy aliphatics from cycle oil derived from a petroleum cracking step and boiling substantially between about 204° C. to about 316° C., the steps comprising in a closed-loop the contacting of a displacer oil comprising a mixture of aromatic-nonaromatic hydrocarbons containing from about 10 to about 50% xylenes with a solvent comprising a solution of about 5 to about 18% water in dimethylformamide in a first extraction zone, removing a first extract mixture from said first extraction zone to a second extraction zone, removing from said first extraction zone a raffinate containing heavy aromatics introducing into the second extraction zone, said cycle oil having a boiling point higher than that of said displacer oil, removing from the second extraction zone a second extract mixture to the first extraction zone, removing from said second extraction zone a raffinate containing heavy aliphatics, and distilling each of said raffinates to recover said heavy aromatics and said heavy aliphatics, respectively.

2. The process of claim 1 wherein the rtaio of displacer oil to cycle oil is about 0.75 to 1.75 lbs. to 1 lb., the temperature of extraction zones 1 and 2 is about 35–41° C., and the preferred ratio of extraction recycle from the second extraction zone to the first to cycle oil is 2.3 to 3.2 lbs. to 1 lb.

3. The process of claim 1 wherein the ratio of displacer oil to cycle oil is 1.25 lbs. to 1 lb., the optimum temperature of extraction zones 1 and 2 is about 38° C., the ratio of extraction recycle from the second extraction zone to the first to cycle oil is about 2.7 lbs./lb.

4. The process of claim 1 wherein the displacer oil is heavy naphtha, and 10%–50% poly lower alkyl aromatic compounds.

5. The process of claim 1 wherein the displacer oil is comprised of heavy naphtha and 25% xylene.

6. The process of claim 1 wherein the cycle oil is comprised of the 204° C. to 316° C. distillation fraction produced from the catalytic cracking of petroleum.

7. The process of claim 3 wherein the displacer oil is comprised of heavy naphtha and 25% xylene.

8. The process of claim 4 wherein the displacer oil is comprised of heavy naphtha and 25% xylene.

9. The process of claim 1 wherein the solvent contains from about 8 to about 12% water in dimethylformamide.

10. The process of claim 1 wherein the solvent contains about 10% water in dimethylformamide.

References Cited

FOREIGN PATENTS

| 829,432 | 3/1960 | Great Britain. |
| 892,139 | 3/1962 | Great Britain. |

OTHER REFERENCES

Somekh, "Hydrocrabon Processing and Petroleum Refiner," vol. 42, No. 10, October 1963, pp. 157–164.

DELBERT E. GANTZ, *Primary Examiner.*

H. LEVINE, *Assistant Examiner.*

U.S. Cl. X.R.

208—314, 317, 318, 324; 260—674